(12) United States Patent
Elder et al.

(10) Patent No.: US 6,931,734 B2
(45) Date of Patent: Aug. 23, 2005

(54) MARKING IMPLEMENT ALIGNMENT AND GUIDE SYSTEM

(75) Inventors: David Elder, Margate, FL (US); Frank Bruno, LakeWorth, FL (US)

(73) Assignee: Whoda Thought Holdings, Inc., Lake Worth, FL (US)

( * ) Notice: Subject to any disclaimer, the term of this patent is extended or adjusted under 35 U.S.C. 154(b) by 102 days.

(21) Appl. No.: 10/141,266

(22) Filed: May 7, 2002

(65) Prior Publication Data

US 2004/0025364 A1 Feb. 12, 2004

(51) Int. Cl.⁷ .................................................. G01B 3/10
(52) U.S. Cl. .............................. 33/42; 33/668; 33/770
(58) Field of Search ........................... 33/42, 668, 755, 33/27.02, 759, 760, 770, 27.031, 27.032

(56) References Cited

U.S. PATENT DOCUMENTS

| | | | |
|---|---|---|---|
| 3,192,630 A | 7/1965 | Dineson | |
| 4,890,393 A | 1/1990 | St. Jean | |
| 5,172,486 A | 12/1992 | Waldherr | |
| 5,295,308 A | 3/1994 | Stevens et al. | |
| 6,070,338 A | 6/2000 | Garity | |
| 6,108,926 A | 8/2000 | Fraser | |
| 6,115,931 A | 9/2000 | Arcand | |
| RE36,887 E | 10/2000 | Goldman | |
| 6,167,635 B1 * | 1/2001 | Lin | 33/767 |
| 6,212,787 B1 | 4/2001 | Dixon | |
| 6,223,443 B1 | 5/2001 | Jacobs | |
| 6,442,863 B1 * | 9/2002 | Poineau et al. | 33/758 |
| 6,470,589 B2 * | 10/2002 | Simmons | 33/759 |
| 6,497,050 B1 * | 12/2002 | Ricalde | 33/770 |
| 6,568,099 B2 * | 5/2003 | Bergeron | 33/770 |

FOREIGN PATENT DOCUMENTS

JP        1267100        10/1989

* cited by examiner

Primary Examiner—Christopher W. Fulton
(74) Attorney, Agent, or Firm—Tangent Law Group; Eric J. Weierstall, esq.

(57) ABSTRACT

This description, together with the objects of the invention and the various features of novelty which characterize the invention are pointed out with particularity in the claims annexed hereto and forming a part of this disclosure. For a better understanding of the invention, its operating advantage is in the specific objects attained by its uses, reference should be had to the accompanying drawings and descriptive matter in which there is illustrated at least one preferred embodiment of the invention.

46 Claims, 3 Drawing Sheets

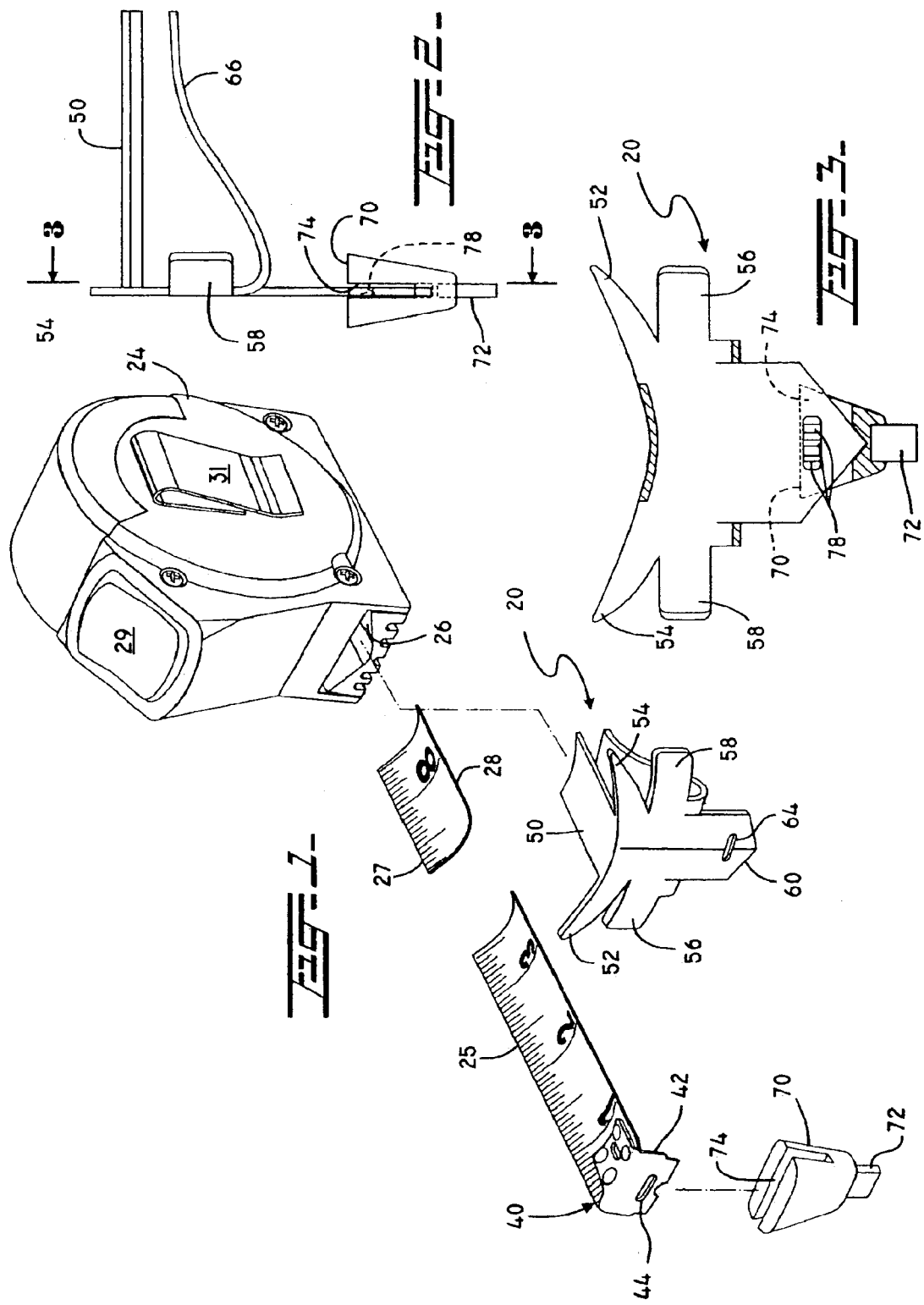

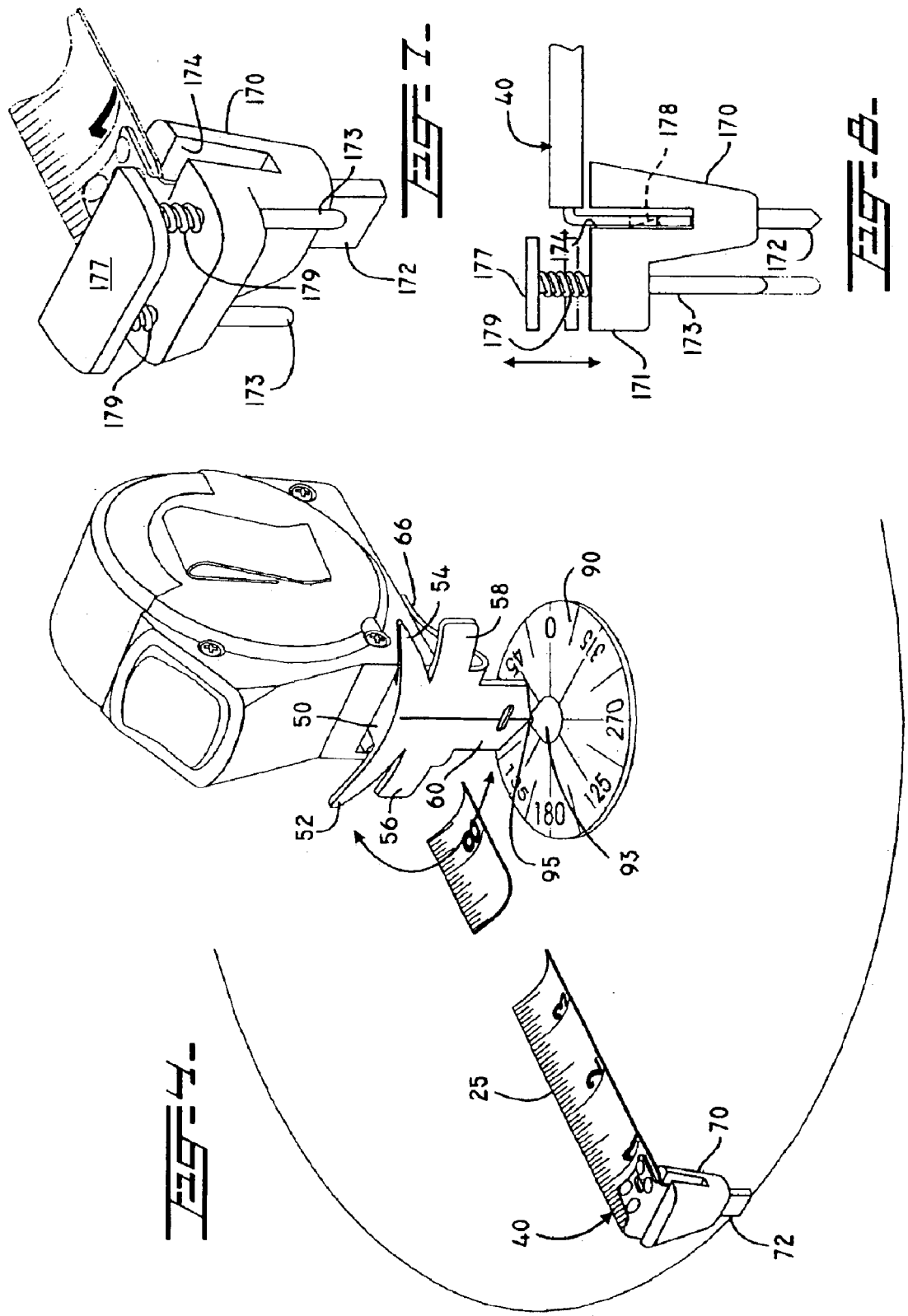

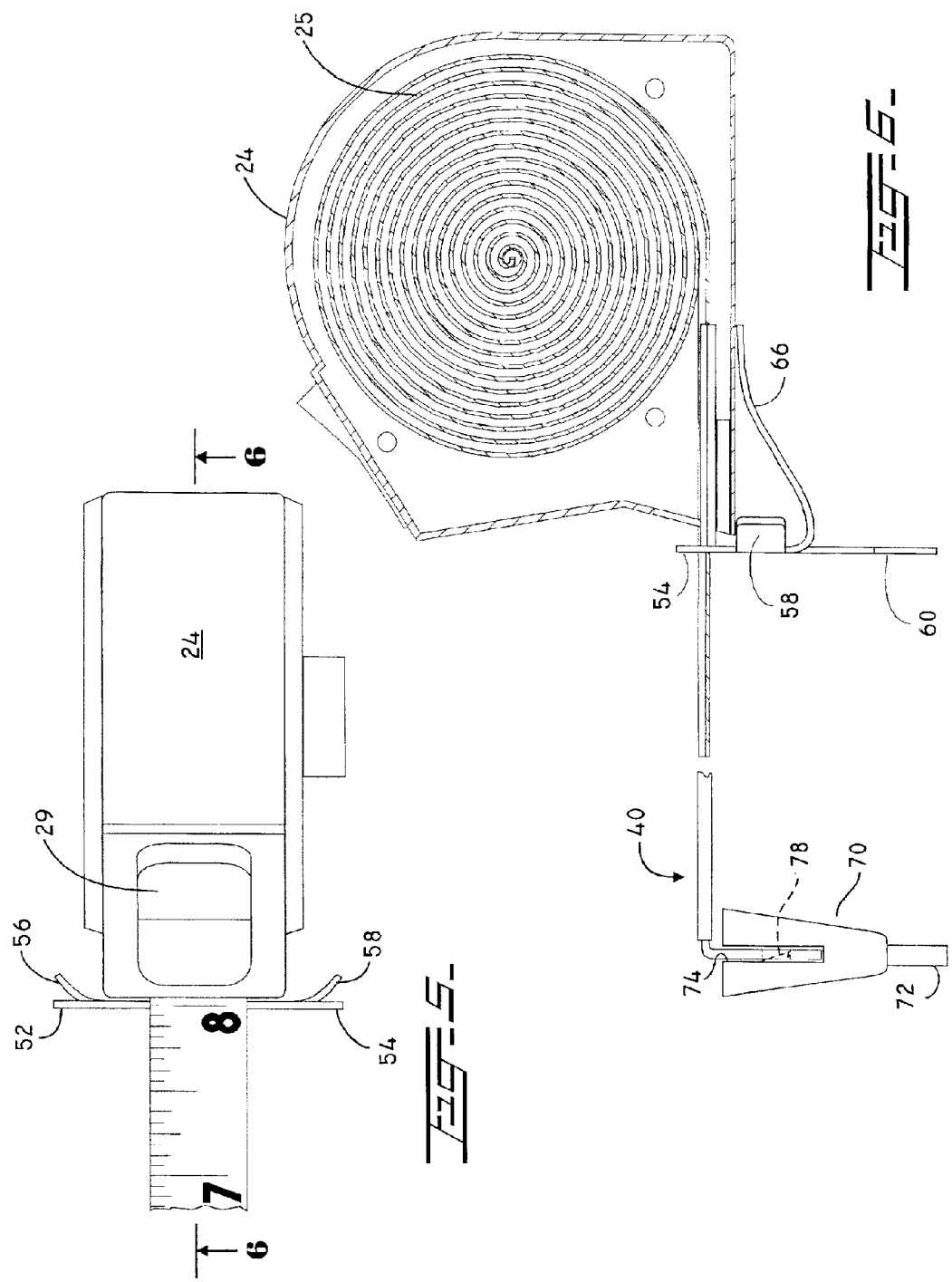

MARKING IMPLEMENT ALIGNMENT AND GUIDE SYSTEM

BACKGROUND OF THE INVENTION

1. Field of the Invention

This invention relates generally to marking systems, and more particularly relates to a versatile tool which is adapted to be used in conjunction with a measuring tape to enable a worker to make accurate alignment marks while engaging in the arts of carpentry, drywall installation, etc.

2. Background Art

Carpenters, drywall installers, sheet metal technicians, steel fabricators and the like often rely on aides to assist them in drawing lines and circles. A common technique used by carpenters or others for marking a line on a work piece is to clamp a measuring tape between two fingers at the desired length relative to an edge of the work piece and then slide their fingers along the edge of the workpiece while holding a pencil with the other hand at the end of the tape, drawing a line along the top of the work piece as the tape is moved. This, however, is dangerous because of splinters and/or burns that occur while sliding one's fingers along a edge in direct contact with the workpiece. Also, the tape measure may not always be at right angles to the edge of the workpiece with the result of there being an error as to the correct location for the line end or variation in the straightness of the line.

The typical tape measure device includes a thin, flexible, narrow steel tape which has a slight upward transverse curvature and typically retractably unrolls from a slot in a compact housing. the tape is provided with a short metal end flange which serves the dual function of preventing the free end of the steel tape from entering the housing of the tape measure through the slot in the housing when retracted and providing the user of the tape measure with a means of conveniently grasping the free end of the tape when manipulating the tape.

Various complex structures have been disclosed for marking and even cutting work pieces. a number of built in or retrofit constructions have been developed for association with tape measuring devices to carry out the simultaneous measuring and marking of a workpiece. These devices are used to make a mark on a workpiece at a given length by attaching the marking device to the case of the tape measure and creating the mark by moving the case back and forth.

A number of prior art patents reveal attempts to provide devices which can assist the workman in marking and cutting along a workpiece. Examples of such attempts are disclosed in:

| Patent No | Issue Date | Inventor |
| --- | --- | --- |
| USA | | |
| RE. 36,887 | Oct. 3, 2000 | Jay Goldman |
| 3,192,630 | Jul. 6, 1965 | L. H. Dineson |
| 4,890,393 | Jan. 2, 1990 | Joseph D. P. St. Jean |
| 5,172,486 | Dec. 22, 1992 | Arthur Waldherr |
| 5,295,308 | Mar. 22, 1994 | Mark D. Stevens |
| 6,070,338 | Jun. 6, 2000 | Michael Garity |
| 6,108,926 | Aug. 29, 2000 | Robert A. Fraser |
| 6,115,931 | Sep. 12, 2000 | Stephane Arcand |
| 6,212,787 B1 | Apr. 10, 2001 | Thomas J. Dixon |
| 6,223,443 B1 | May 1, 2001 | Danny L. Jacobs |

-continued

| Patent No | Issue Date | Inventor |
| --- | --- | --- |
| FOREIGN | | |
| JP401267100A | Oct. 24, 1989 | Takayoshi Oitate |

None of the teachings in any of these patents, however, provide a simple, easy-to-use, add on to existing retractable measuring tapes which provides a multiple of features in a single system. Further, it is believed that prior inventions intended to address the shortcomings present in the relevant industries are not widely available because of manufacturing difficulties and the matter in which the device is operated.

U.S. Pat. No. 6,212,787, to Dixon discloses a tape measure having a writing instrument mounting structure at the free end of the tape. Dixon does not, however, provide any means whatsoever for assisting the operator in sliding the tape measure housing along the edge of a workpiece during a measurement, marking or cutting operation.

U.S. Pat. No. 6,223,443, to Jacobs discloses a pattern developing tool having a belt clip to which can be mounted a writing instrument adjacent the tape housing and a pivotal bracket and marker holder adapted to be attached to the free end of the tape. Jacobs also does not disclose any means for assisting the operator in sliding the tape measure housing along the edge of a workpiece. Furthermore, the belt clip of Jacobs does not appear to be universally adaptable to the wide variety of makes of retractable tape measure devices on the market today.

U.S. Pat. No. RE36000,887 to Goldman discloses a custom-made tape measure and marking device in which a secondary tape free and is mounted to the primary free end of the tape by inserting a slot on the secondary free end into a corresponding loop fixedly mounted to the primary free end of the tape, and a pivotally disposed element connected to the housing for protecting the index finger of the hand of a person holding the casing and moving it along an edge of the workpiece. The Goldman device must be manufactured with the custom features disclosed, and therefore cannot be retrofit on any of the existing wide variety of devices on the market. Moreover, the Goldman device lacks most of the features of the instant invention.

U.S. Pat. No. 6,115,931 to Arcand discloses a tape measure device with a measuring tape blade having a swivelling end assembly adapted to hold an attachment rotatably with respect to the free end of the tape. The Arcand device, like that of the two previous devices, must be custom made as it lacks the downwardly depending flange found on virtually all tape measure on the market today.

U.S. Pat. No. 6,108,926 to Fraser discloses a retractable tape measure having a custom tape end assembly adapted to be fixedly connected via a mechanical screw-type fastener to the free end of the tape having a sharp pointed hook shiftably supported thereto. In addition, the Fraser device does not include any means for assisting the user in sliding the housing along the edge of a workpiece.

U.S. Pat. No. 6,070,338 to Garity discloses a device for measuring and cutting sheet rock which includes a tape free end-mounted edge guide which has a smooth surface for sliding the edge along the edge of a workpiece and a tape which is of substantially larger width than normal readable in both directions. The edge guide is adapted to allow a knife blade to be held by hand by the operator there against so as to allow the sheet rock to be cut along a line parallel to its edge. Garity does not disclose any means for assisting the user in sliding the housing along the edge of the workpiece, and requires the use of another type of custom made tape free end.

U.S. Pat. No. 5,295,308 to Stevens discloses a measuring, cutting and marking tool incorporating a tape measure having a case with a holder for a marking or cutting device integrally formed thereon. The Stevens device discloses a sliding member which is a custom made arrangement permanently mounted to the free end of the tape and which is used to slide the free end of the tape along the edge of the workpiece which the writing instrument attached to the tape measure housing is used to mark a line parallel to the edge of the workpiece. The Stevens device is cumbersome in that it is easier to slide the housing along the edge of the workpiece than the end of the tape due to the inertia created by the moving tape housing during marking operations.

U.S. Pat. No. 5,172,486 to Waldherr discloses a fixture for use with a retractable tape measure having a tab at the free end of the tape perpendicular to the tape. The fixture has a base with opposed sidewalls at least one of which defines a recess for receiving the tape end tab therein. Like the device of Stevens, the Waldherr device requires the writing instrument to be attached to the housing while the free end of the tape is slid along the edge of the work piece.

U.S. Pat. No. 4,890,393 to Saint Jean discloses a measuring tape guide attachment having a guide for marking which attaches to the opening or slot in the housing through which the measuring tape is extended and retracted. The attachment, however, is overly long and barely extends into the tape measure housing, rendering it susceptible to the torsional forces exerted upon the writing instrument which is hand-held against the free end of the tape during the marking operation.

U.S. Pat. No. 3,192,630 to Dineson, discloses a tape measure device which employs a guard member having an arm that is fixedly attached to the exterior of the tape measure housing and a downwardly depending, narrow, flat portion adapted to slide along an edge of a workpiece. The Dineson device also includes a writing or cutting tip adapted to be removably attached to the free end of the tape. The Dineson device does not, however, provide a stabilizing element on the housing-mounted guide, and the guide can be easily dislodged from connection to the housing due to its attachment by only a small spring element. Furthermore, the Dineson device does not provide the additional inventive features disclosed in the invention herein.

Japanese Patent No. 4,0126,7100A discloses, as best can be discerned, a tape measure device having a tape which assumes an inflexible shape when drawn out from the housing, and a support for attaching a writing instrument to the free end of the tape. The device disclosed in the Japanese patent is only directed toward drawing an arc on a workpiece and requires a custom tape element of which the inventors of the instant invention are unaware.

Accordingly, it is an object of this invention to provide a marking or cutting system which is simple and inexpensive to manufacture and easy to use.

It is also an object of this invention to provide a marking system having a variety of features but which, in combination, will satisfy the needs of the average construction worker needing to mark lines and arcs accurately, quickly and with a minimum of manual labor.

It is a further object of this invention to provide a clip which connects through a slot in a tape measure housing parallel to an extended measuring tape, which has alignment extensions for greatly facilitating the visual identification of the markings on the tape, a sliding facilitator, and a variety of marking or cutting tips adapted to be mounted to either the clip or a standard depending flange at the free end of the tape.

Further objects of this invention will become apparent as the description proceeds.

SUMMARY OF THE INVENTION

The invention is directed to a system for permitting highly accurate marking to be made upon a workpiece such as drywall, plywood, etc including a clip comprised of a body member, a tongue member attached at right angles thereto, and a spring member, the tongue member and spring member cooperating to retain the tongue member within a slot of a tape measure housing. The tongue member may be contoured to conform to the arcuate shape of a measuring tape. A pointed attachment will also be provided which is adapted to be attached to the distal end of the measuring tape to act as a measuring tape distal end anchor or writing implement. The pointed attachment and clip are adapted to cooperate to permit a user of the measuring tape and housing to draw arcs on the workpiece or straight lines on a workpiece parallel to an edge of the workpiece.

This description, together with the objects of the invention and the various features of novelty which characterize the invention are pointed out with particularity in the claims annexed hereto and forming a part of this disclosure. For a better understanding of the invention, its operating advantage is in the specific objects attained by its uses, reference should be had to the accompanying drawings and descriptive matter in which there is illustrated at least one preferred embodiment of the invention.

BRIEF DESCRIPTION OF THE DRAWINGS

FIG. 1 is a perspective view of the system of the preferred embodiment of this invention.

FIG. 2 is a side elevational view of a component of the system.

FIG. 3 is a front cross-sectional view of the component shown in FIG. 2.

FIG. 4 is a perspective view of an additional feature of the invention.

FIG. 5 is a top plan view of the clip of the instant invention connected to a tape measure housing.

FIG. 6 is a cross-sectional side elevational view of the instant invention attached to a tape measure housing.

FIG. 7 is a perspective view of a modified component of the invention.

FIG. 8 is a side elevational view of the component shown in FIG. 5.

DETAILED DESCRIPTION OF THE PREFERRED EMBODIMENTS

FIGS. 1 through 3 and FIGS. 5 and 6 disclose the preferred embodiment of the invention which includes a clip 20 adapted to be releasably attached to a tape measure housing 24. The tape measure housing 24 can be of any of the multitude of designs available today having an interior cavity adapted to house a semi-flexible measuring tape 25 in spooled orientation which is deployed and retracted though an opening slot 26. Such tape measures typically have a braking or locking device actuated by a button 29 or the like, and may have such accessories as a belt clip 31. the position, location and operation or features of the tape measure may vary without affecting the scope of the invention. Tape 25 is provided with spaced demarcations for purposes of measuring distances, and has a distal end 40 bearing a hook-shaped member 42 which can be grasped to withdraw the tape 25 from housing 24, and can be placed against a surface or edge to allow one-handed retraction of the tape from the housing, as is well known with devices of this type.

Hook member 42 typically defines an elongated through-slot 44.

Clip 20 has a generally horizontally disposed tongue or finger 50, which may (or may not depending upon the shape of the tape) have an arcuate shape when viewed elevationally to conform to the shape of a standard measuring tape 25. Finger 50 is connected to the remainder of clip 20 at a point where a pair of left and right alignment tabs 52, 54 are provided. Alignment extensions or tabs 52, 54 extend generally beyond the outer edges 27, 28 of tape 25 to act as alignment guides, making it easier to ascertain the point at which demarcations on the tape align with clip 20 for purposes which will be apparent herein below.

Clip 20 also includes guide plates 56, 58 which end in a slight flare. Clip 20 also includes a depending, pointed, tang 60 defining a slot 64 similar in shape and size to slot 44 of hook member 42. A biasing element 66 extends rearwardly of tang 64 on clip 20, and is spaced by a distance from the underside of finger 50 which corresponds to, or is slightly less than the thickness of housing 24 below access slot 26 thereof. In this way, clip 20 may be held in place against housing 24 by sliding finger 50 into slot 26 below tape 25, whereupon spring member 66 will bear upon the underside of housing 24, retaining clip 20 in place with respect to housing 24. A useful feature of the invention is found in marking implement 70, which includes a body portion which defines a hook-tab receiving slot 74 for receiving hook member 42, and a writing or other marking or pivot element 72. As best seen in FIGS. 2 and 3, a series of ridges or serrations 78 are integrally connected to member 70 within slot 74, and have a width generally corresponding to the width of slot 44 in hook member 42. In this way, member 70 can be remissably connected to hook member 42 of measuring tape 25. The provision of a parality of ridges 78 is intended to facilitate connection of member 70 to tapes having variously sized hook members.

Referring now to FIG. 4, there is shown a radial alignment tool 90 which, in its preferred form, is comprised of a circular suction cup having a raised central portion 93 having a tang receiving depression 95 therein adapted to receive the pointed end 60 of clip 20. Tool 90 permits a user to place clip 20 into depression 95 and rotatably pivot clip 20, and tape measure housing 24, thereabout and to deploy measuring tape 25 a distance equal to the radius of an arc or circle for purposes of inscribing an arc or circle on a work piece or surface. Measuring tape 25 is deployed a distance corresponding to the arc or circle radius, and inscribing tool 70 is attached to hook end 42 of the tape 25. Tape 25 is locked in the deployed position by depressing locking mechanism 29 such that the demarcation on tape 25 corresponding to the desired radial distance aligns with measurement indicating extensions 52, 54 of clip 20. Tool 90 may employ angular position demarcations which tape 25 can be placed in alignment with to precisely measure angles to be marked on a workpiece.

FIGS. 7 and 8 illustrate a modified scribing instrument comprising a body member 70 adapted to be connected to hook and 42 of measuring tape 25 in a manner similar to that described for member 70. Ridges or serrations 178 are provided within slot 174 defined by body member 170. A writing or scribing element 172 is provided, which may be a pencil point or sharp metal point about which hook end 42 may be rotated.

Another improvement is found in the form of a structure for facilitating sliding movement of scribing element 172 along a work piece or surface and includes a body extension portion 171 which defines a pair of parallel apertures there through 175 through which are disposed a pair of guide pins 173, each preferably having a rounded or other surface having a low co-efficient of friction. A pair of corresponding compression springs 179 are disposed about guide pins 173 between body extension member 171 and a depression tab 177. In this way, when scribe element 172 is to be dragged or otherwise translated along a work piece or surface, tab 177 is depressed which will cause the bottom ends of pins 173 to come into contact with said work piece or surface, and consequently be aligned with the bottom most edge of element 172, to facilitate the translation of element 172 along a work surface. For example, where element 172 is a writing tip, such as a lead pencil, such point might tend to snag or get caught on irregularities in the work piece or surface and low-friction bottom sections of pins 173 will assist in avoiding such tendencies. Releasing tab 177 will cause springs 179 to force tab 177 and pins 173 to raise up to the position shown in FIGS. 5 and 6.

It is to be understood that the inventions disclosed herein are not limited to the precise constructions shown and described but that changes are contemplated which will readily fall within the spirit of the invention as shall be determined by the scope of the following claims:

What is claimed is:

1. A system in conjunction with a retractable tape measure device, the device being characterized as having housing and a self-recoiling measuring tape housed therein in a spooled orientation, the measuring tape being slidably disposed within a slot defined by the housing through which the tape can be deployed and retracted, the measuring tape having spaced demarcations permanently affixed thereto to facilitate measuring distances, the measuring tape ending at a distal end in a right-angled member defining an elongated slit therein, the system comprising;

a clip comprising a body member having a generally flat, planar, center portion terminating at a lower end in a bottom edge and terminating at an upper end in an upper edge;

a tongue member connected to the upper edge at a substantially ninety-degree angle relative to the body member, the tongue member adapted to be removably placed within the housing slot below the measuring tape;

a spring member connected at a generally mid-section of the body member generally co-extensively with the tongue member and spaced therefrom to hold the tongue member in the housing slot by spring action;

the upper edge and a front surface of the body member aligning in parallel relationship with the measuring tape demarcations to facilitate accurate detection of distances being measured by the measuring tape.

2. The system of claim 1, wherein the tongue member defines an upper surface which conforms generally to the contour of a bottom surface of the measuring tape.

3. The system of claim 2, further comprising at least one alignment extension attached to the body member of the clip along the upper edge thereof to create an extended measuring tape demarcation alignment interface.

4. The system of claim 1, further comprising at least one alignment extension attached to the body member of the clip along the upper edge thereof to create an extended measuring tape demarcation alignment interface.

5. The system of claim 4, wherein the at least one alignment extension includes a pair of opposed extensions connected to the upper edge of the body member.

6. The system of claim 1, further comprising a pointed attachment member adapted to be removably attached to the slit in the distal end of the measuring tape.

7. The system of claim 6, wherein the pointed member includes a carbon-graphite writing point.

8. The system of claim 7, wherein the clip further includes an elongated opening defined by the bottom portion of the body member corresponding in size generally to the slit, both the slit and the elongated opening being sized and shaped to engage a corresponding attachment projection associated with the pointed member.

9. The system of claim 7, wherein the pointed member also includes means for assisting in translation of the writing point over a surface of a workpiece.

10. The system of claim 9, wherein the means for assisting includes at least one assisting leg reciprocally connected to the pointed member and movable between a first, non-workpiece surface engaging, position and a second, workpiece engaging, position in which the assisting leg is substantially or actually brought into contact with the workpiece surface.

11. The system of claim 10, wherein the means for assisting includes at least two assisting legs, a push tab connected transversely thereto, and at least one spring to normally bias the push tab into the first non-workpiece engaging position.

12. The system of claim 11, further including a substantially circular disc adapted to be placed upon the surface of the workpiece and having means associated therewith for removably attaching the bottom edge of the body member thereto for drawing arcs when the pointed member is connected to the distal end of the measuring tape.

13. The system of claim 1, further comprising a pair of guide extensions connected to the body member adapted to facilitate sliding movement of the clip and tape measure housing parallel to an edge of a workpiece.

14. A system for attachment to a housing of a retractable tape measure device, the device being characterized as having a self-recoiling measuring tape housed therein in a spooled orientation, the measuring tape being slidable disposed within a slot defined by the housing through which the tape can be deployed and retracted, the measuring tape having spaced demarcations permanently affixed thereto to facilitate measuring distances, the measuring tape ending at a distal end in the shape of a right-angled member defining an elongated slit therein, the system comprising;

a clip comprising a body member having a generally flat, planar, center portion defining a workpiece edge abutment surface and terminating at a lower end in a bottom edge and terminating at an upper end in an upper edge;

a tongue member connected to the upper edge at a substantially ninety-degree angle relative to the body member, the tongue member adapted to be removably placed within the housing slot below the measuring tape;

a curved spring member connected at a generally mid-section of the body member and generally co-extensive with the tongue member and spaced therefrom to hold the tongue member in the housing slot by spring action; the upper edge and a front surface of the body member aligning in parallel relationship with the measuring demarcations can facilitate accurate detection of distances being measured by the measuring tape; and at least one guide extension connected to the body member and defining a workpiece edge abutment surface extension substantially parallel to the workpiece edge abutment surface defined by the body member center portion.

15. The system of claim 14, wherein the tongue member has a shape which conforms generally to the contour of a bottom surface of the measuring tape.

16. The system of claim 15, fairly comprises at least one alignment extension attached to the body member of the clip along the top edge thereof to extend the measuring tape demarcation alignment interface.

17. The system of claim 16, wherein the demarcation alignment interface includes a pair of opposed extensions connected to the top edge of the body member.

18. The system of claim 17, further comprising at least one alignment extension attached to the body member of the clip along the top edge thereof to extend the measuring tape demarcation alignment interface.

19. The system of claim 18, further comprising a pointed attachment member adapted to be removably attached to the slit in the distal end of the measuring tape.

20. The system of claim 19, wherein the pointed member includes a carbon-graphite writing point.

21. The system of claim 20, further including an elongated opening defined by the bottom portion of the body member corresponding in size generally to the slit, both the slit and the elongated opening being sized and shaped to engage a corresponding projection associated with the pointed member.

22. The system of claim 21, further comprising a pair of workpiece-contacting extensions connected to the body member adapted to facilitate sliding movement of the clip and tape measure housing parallel to an edge of a workpiece.

23. The system of claim 22, wherein the pointed member also includes means for assisting in translation of the carbon-graphite writing point over a surface of a workpiece.

24. The system of claim 23, wherein the means for assisting includes at least one assisting leg reciprocally connected to the pointed member and movable between a first, non-workpiece surface engaging position and a second, workpiece engaging position in which the assisting leg is substantially or actually brought into contact with the workpiece surface.

25. The system of claim 24, wherein the means for assisting includes at least two assisting legs, a push button plunger tab connected transversely thereto, and at least one spring to normally bias the push button into the first non-workpiece engaging position.

26. The system of claim 25, further including a substantially circular disc adapted to be placed upon the surface of the workpiece and having means associated therewith for removably attaching the bottom edge of the body member thereto for drawing arcs when the pointed member is connected to the distal end of the measuring tape.

27. A system for attachment to a housing of a retractable tape measure device, the device being characterized as having a self-recoiling measuring tape housed therein in a spooled orientation, the measuring tape being slidable disposed within a slot defined by the housing through which the tape can be deployed and retracted, the measuring tape having spaced demarcations permanently affixed thereto to facilitate measuring distances, the measuring tape ending at a distal end in the shape of a right-angled member defining an elongated slit therein, the system comprising;

a guide member having a generally flat workpiece-edge-engaging surface, an elongated tongue perpendicularly connected to the guide member forming an upper edge of the guide member, a spring member connected to the guide member adapted to retain the tongue in position within the slot below the measuring tape, the upper edge defining a line which is parallel to the measuring demarcations on the measuring tape.

28. The system of claim 27, further including a writing attachment adapted to be removably connected to the distal end of the tape and utilized to draw a line or lines on a surface of a workpiece while the guide surface is moved along an edge of the workpiece.

29. The system of claim 27, further including an anchoring attachment adapted to be removably connected to the distal end of the measuring tape to anchor the distal end of the measuring tape in position to permit the guide member to be rotated with the measuring tape housing about the anchoring attachment to draw an arc thereabout when a writing attachment is attached to a lower portion of the guide member.

30. The system of claim 27, further including a substantially circular disc adapted to be placed upon the surface of a workpiece and having means associated therewith to which the guide member can be attached to act as a pivot about which the guide member and tape measure device can be rotated while arcs are drawn on corresponding workpieces.

31. The system of claim 30, further including a plurality of equally spaced demarcation on the disc corresponding to specific angular positions of the tape measure device relative to the disc.

32. A system for use in conjunction with a retractable tape measure device, the retractable tape measure having a housing and a self-recoiling measuring tape housed therein in a spooled orientation, the measuring tape being slidably disposed within a housing slot defined by the housing through which the measuring tape can be deployed and retracted, the measuring tape having spaced demarcations affixed thereto to facilitate measuring distances, the measuring tape ending at a distal end in a substantially right-angled member defining an elongated slit therein, the system comprising;
    a clip comprising
        a body member having a generally flat, planar, center portion terminating at a lower end in a bottom edge and terminating at an upper end in an upper edge;
        a tongue member connected to the upper edge at a substantially ninety-degree angle relative to the body member, the tongue member placed within the housing slot below the measuring tape;
        a spring member connected to the body member generally co-extensively with the tongue member and spaced therefrom to retain the tongue member within the housing slot, the upper edge and a front surface of the body member aligning in parallel relationship with the measuring tape demarcations to facilitate accurate detection of distances being measured by the measuring tape.

33. A marking implement system for use in conjunction with a retractable tape measure device, the retractable tape measure having a housing and a measuring tape housed therein, the measuring tape being slidably disposed within a housing slot defined by the housing, the measuring tape having spaced demarcations affixed thereto to facilitate measuring distances, the measuring tape ending at a distal end in a substantially right-angled member having an elongated slit defined in said right angled member, the system comprising:
    a body portion comprising
        a receiving slot for receiving the substantially right angled member and
        a marking element, such that said marking element extends substantially directly from the end of said right angled member and an at least one retaining member integrally connected to said marking element within said elongated slit, wherein said body portion is removable from said right angled member.

34. The marking implement system of claim 33, wherein the at least one retaining member further comprises a plurality of ridges.

35. The marking implement system of claim 34, wherein the ridges have a width generally corresponding to the width of the elongated slit in said substantially right angled member.

36. The marking implement system of claim 34, wherein the ridges are releasably engageable within said elongated slit, thereby allowing release of the marking element.

37. The marking implement system of claim 33, wherein the marking element is a writing element.

38. The marking implement system of claim 37, wherein the writing element comprises a pencil or lead or chalk or graphite writing element.

39. The marking implement system of claim 33, wherein the marking element is a scribing element.

40. The marking implement system of claim 39, wherein the scribing element is a sharp metal point.

41. The marking implement system of claim 33, the body member further comprising
    a body extension portion and at least one aperture having at least one guide pin extending therethrough.

42. The marking implement system of claim 41, further comprising a low coefficient of friction tip for the at least one guide pin.

43. The marking implement system of claim 41, wherein the at least one guide pin is rounded.

44. The marking implement system of claim 41, further comprising a like number of compression springs disposed about said at least one guide pin between said body extension member and a depression tab, wherein said depression tab is engaged to engage said at least one guide pin and extend said guide pin from said body extension.

45. The marking implement system of claim 41, wherein releasing said depression tab causes said like number of compression springs to force said depression tab and said at least one pin into a raised position.

46. The marking implement system of claim 33, wherein the marking element is removable.

* * * * *